United States Patent
Seyfang (12)

(10) Patent No.: US 6,520,450 B1
(45) Date of Patent: Feb. 18, 2003

(54) V/STOL AIRCRAFT

(75) Inventor: George R. Seyfang, Lancashire (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/264,982

(22) Filed: Mar. 8, 1998

(30) Foreign Application Priority Data

Mar. 25, 1998 (GB) .............................................. 9806241

(51) Int. Cl.$^7$ .............................................. B64C 29/00
(52) U.S. Cl. ........................................ 244/12.5; 60/228
(58) Field of Search ..................... 244/12.5; 60/226.1, 60/228, 232

(56) References Cited

U.S. PATENT DOCUMENTS

| | | | | |
|---|---|---|---|---|
| 2,912,188 A | * | 11/1959 | Singelmann et al. | ...... 244/12.5 |
| 3,285,537 A | * | 11/1966 | Whittley | ..................... 244/12.5 |
| 3,404,853 A | * | 10/1968 | Miller | ......................... 244/12.5 |
| 3,835,643 A | * | 9/1974 | De Garcia, Jr. et al. | ...... 60/230 |
| 4,896,846 A | * | 1/1990 | Strom | ........................ 244/12.5 |
| 5,320,305 A | * | 6/1994 | Oatway et al. | ............ 244/12.3 |
| 5,323,606 A | * | 6/1994 | Pesyna et al. | ................. 60/232 |

FOREIGN PATENT DOCUMENTS

| | | | | |
|---|---|---|---|---|
| DE | 1085767 | * | 12/1958 | ................ 244/12.5 |
| GB | 1168143 | * | 10/1969 | ................ 244/12.5 |

* cited by examiner

Primary Examiner—Stephen M. Johnson
(74) Attorney, Agent, or Firm—Nixon & Vanderhye P.C.

(57) ABSTRACT

An aircraft having a powerplant with an aft-directed main propulsion outlet means for providing forward thrust, and further including duct means having an inlet for receiving at least a proportion of the efflux from said main propulsion outlet and extending forwardly to an auxiliary outlet disposed adjacent or forwardly of the centre of gravity of the aircraft, said auxiliary outlet being arranged to exhaust efflux with at least a vertical component.

10 Claims, 2 Drawing Sheets

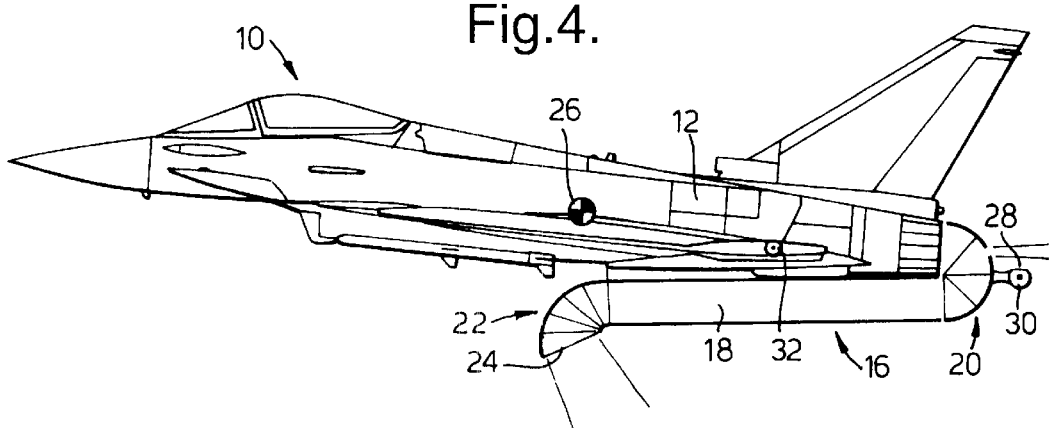
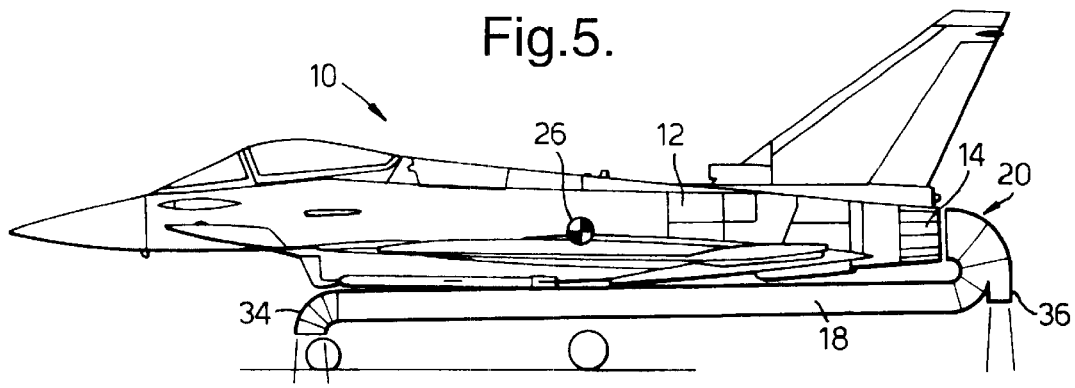
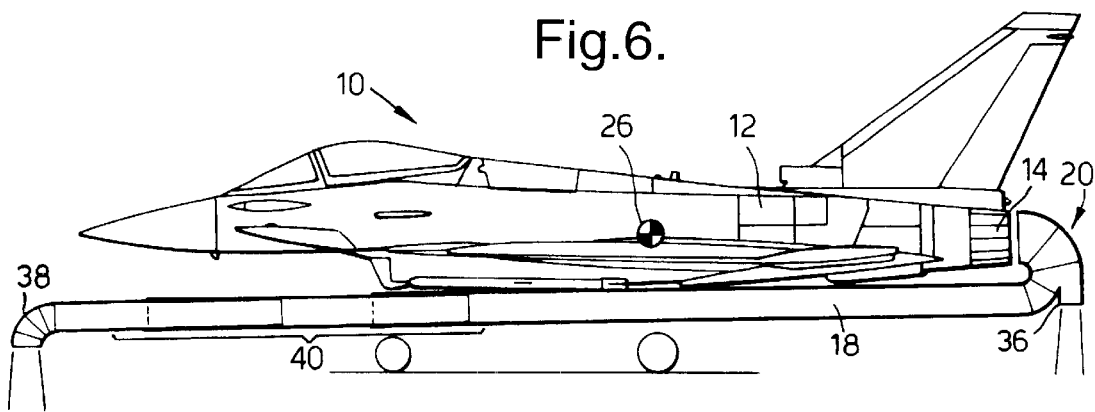

V/STOL AIRCRAFT

BACKGROUND OF THE INVENTION

1. Field of the Invention

This invention relates to vertical and/or take-off and landing (V/STOL) aircraft.

2. Discussion of Prior Art

There are many designs of V/STOL aircraft such as the Harrier in which the thrust generated by the aircraft powerplant is exhausted through nozzles which may be vectored downwardly to provide a component of vertical lift. The market for V/STOL combat aircraft is relatively small and the high cost associated with design, testing and production of a new aircraft means that, in practice, some developments are based on existing designs.

Several attempts have been made to design a vertical landing variant of a conventional landing combat aircraft such as the European Fighter Aircraft (EFA) but the result has usually been that the internal vertical lift modifications required ripple through the aircraft, leaving little of the original, and thus requiring major redesign.

Accordingly a need exists for a V/STOL configuration aircraft which requires less modification of the internal structure which allows a conventional landing combat aircraft to be configured for V/STOL operation, either during original manufacture, or a refit, or as required.

SUMMARY OF THE INVENTION

In one aspect, this invention provides an aircraft having a powerplant with an aft-directed main propulsion outlet means for providing forward thrust, and further including duct means having an inlet for receiving at least a proportion of the efflux from said main propulsion outlet means and extending forwardly to an auxiliary outlet disposed adjacent or forwardly of the centre of gravity of the aircraft, said auxiliary outlet being arranged to exhaust efflux with at least a vertical component.

By this arrangement, a proportion of the efflux from the main powerplant is collected from the main propulsion outlet and conveyed forwardly to exhaust with a downward component, thereby generating lift.

Preferably, said auxiliary nozzle is vectorable to vector the thrust generated by said outlet.

The duct means is preferably disposed generally externally of the main body of the aircraft. Preferably at least part of the duct means is moveable to a low drag stowed configuration for normal flight. Thus the end portions of the duct, which turn the efflux through a substantial angle, may be stowed to a low profile configuration. In one arrangement, the remainder of the duct may be left open-ended to provide low drag. In another configuration, the whole duct may be made collapsible so that it may be collapsed or concertina-ed to a low profile position adjacent the aircraft body.

Where the aircraft powerplant has two or more aft-directed propulsion outlets, the duct means conveniently has an inlet having respective inlet aperture regions facing or engaging with the associated propulsion outlets.

The auxiliary propulsion outlet may take many forms. In one arrangement, the auxiliary propulsion outlet may be disposed adjacent the centre gravity of the aircraft, exhausting substantially all of the efflux received from the aircraft powerplant. Alternatively, the auxiliary propulsion outlet may be disposed forwardly of the centre of gravity of the aircraft, with the duct including a further auxiliary outlet means disposed rearwardly of the centre of gravity. The dimensions and location of the outlets are preferably selected such that any resultant pitching moment applied thereby is nil or relatively low. In another development of this arrangement, the further auxiliary outlet may be disposed forwardly beyond the aircraft nose. In this case, the further auxiliary outlet may be provided in the end of a portion which is telescopically moveable with respect to the remainder of the duct means.

The aircraft preferably also includes reaction control means for trim and control during hovering, which advantageously comprise, reaction control nozzles, at least some of which receive and exhaust a portion of the efflux in said duct means.

Whilst the invention has been described above, it extends to any inventive concept set out above or in the following description.

BRIEF DESCRIPTION OF THE DRAWINGS

The invention may be performed in various ways, and an embodiment thereof will now be described by way of example only, reference being made to the accompanying drawings, in which:

FIG. 4 is a schematic side view of the aircraft of FIG. 1 in transition between hover and wing-borne flight;

FIG. 5 is a schematic side view of a second embodiment of an aircraft including a vertical lift system in accordance with this invention including a lift duct with two auxiliary outlets, and FIG. 6 is a schematic view of a third embodiment of aircraft with a vertical lift system in accordance with this invention, with the duct including a forward, telescopically mounted auxiliary outlet and a rearward outlet.

DETAILED DESCRIPTION OF EMBODIMENTS

Figure 1:
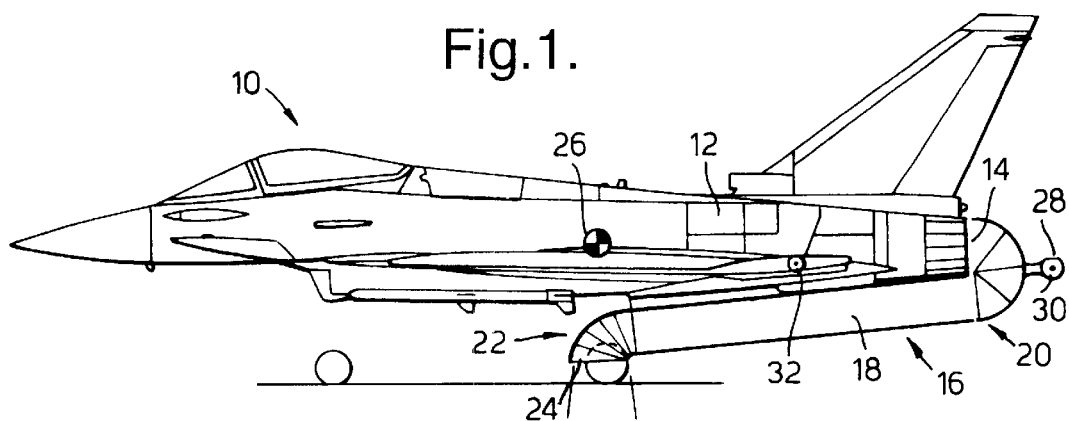
FIG. 1 is a schematic side view of a conventional landing combat aircraft incorporating a vertical lift system in accordance with this invention, with the vertical lift duct deployed.
Figure 2:
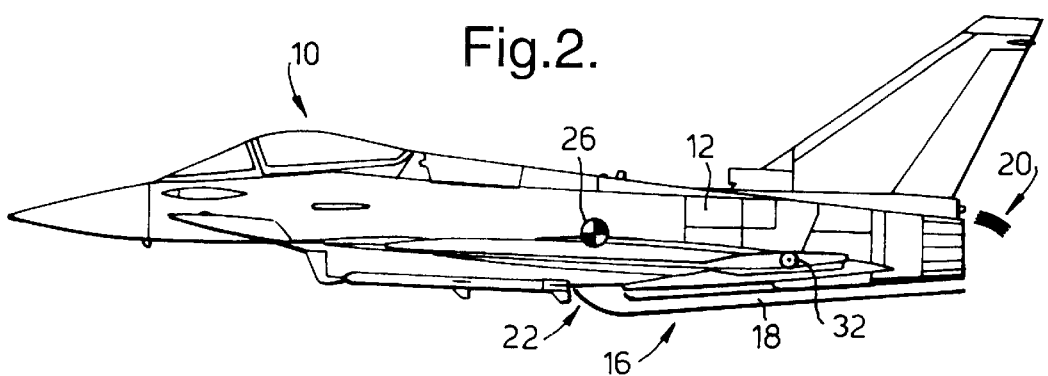
FIG. 2 is a schematic side view of the aircraft of FIG. 1 in normal flight mode, but with the vertical lift duct in a stowed condition.

Referring initially to FIG. 1, there is shown a conventional landing combat aircraft 10 having a powerplant 12 with twin main propulsion outlets 14 (only one of which is shown). The aircraft is fitted with a vertical lift system 16 which here comprises a duct 18 having one end section 20 which turns through approximately 180 to present its upstream inlet adjacent the main propulsion outlets 14. The downstream outlet end of the duct 18 comprises a section 22 which turns through about 90 to terminate in a vectorable auxiliary nozzle 24 which exhausts the flow generally downwardly in line with the centre of gravity 26 of the aircraft. As shown in FIG. 2, the upstream turning section 20 of the duct 18 may be stowed during normal forward flight so that the main propulsion outlets 14 are unobstructed by the device. Likewise the duct 16 is collapsible to a flat cross section adjacent the aircraft skin to reduce or minimise drag.

When in the configuration of FIG. 2, the aircraft 10 may fly and manoeuvre conventionally, powered by the thrust generated at the main propulsion outlets 14 and controlled by the conventional moveable control surfaces of the aircraft.

Figure 3:
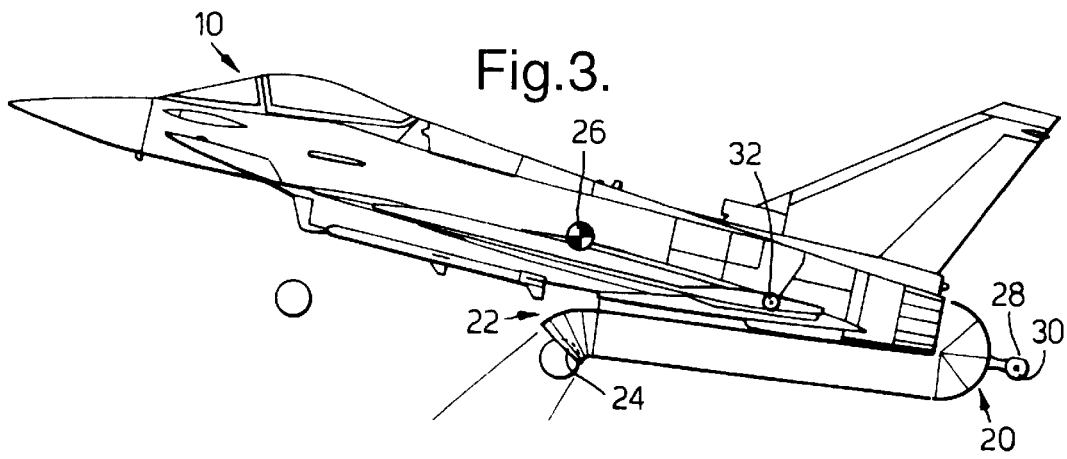
FIG. 3 is a schematic side view of the aircraft of FIG. 1 in transition between normal forward flight and hover.

In preparation for landing, the duct 18 is moved to the deployed position as shown in FIG. 3 with the auxiliary nozzle 24 directed downwardly and forwardly to provide a retarding thrust and upward lift. Once the aircraft has slowed to the required speed, the auxiliary nozzle 24 may be directed vertically downwards to provide lift alone, for hover. In this condition, the aircraft may be trimmed and controlled using a reaction system associated with the duct which has reaction control nozzles 28, 30 for effecting control movements about the pitch and yaw axes of the aircraft, together with wing tip reaction control nozzles 32 for roll control. In the hover state, the aircraft may be lowered gently to the ground by controlling the main powerplant gradually to reduce thrust.

The aircraft may take off vertically with the auxiliary nozzle 24 pointing vertically downwards and then move into forward, wing borne flight by directing the auxiliary nozzle 24 rearwardly to provide forward thrust. As shown in FIG. 4, in this condition the forward thrust may also be augmented by allowing a component of the flow in the duct to exhaust rearwardly through section 20.

Referring now to FIGS. 5 and 6, the arrangements here are generally similar to those of the previous embodiments insofar as there is a duct which receives propulsion efflux from the main powerplant 12 for providing vertical lift. In the arrangement of FIG. 5, about 60% of the efflux in the duct 18 is exhausted through a forward vectorable nozzle 34 forward of the centre of gravity 26 of the aircraft whilst the remaining 40% exhausts from a nozzle near the rear turning section 20. In the arrangement of FIG. 6, the efflux in the duct is split between a forward auxiliary nozzle 38 mounted in a telescopic portion 40 of the duct 18 and the rearward nozzle 36 adjacent the turning section 20. In this arrangement the flows are such that the forward auxiliary nozzle 38 develops about 40% of the thrust whilst the rearward nozzle 36 develops about 60%.

The arrangements of FIGS. 5 and 6 have the advantage that a smaller proportion of the efflux passes through nearly 180, thus reducing turning losses.

The arrangements illustrated may be modified to incorporate inlets to allow secondary air induction so as to cool the exhaust gases and increase the mass flow by the ejector effect.

What is claimed is:

1. An aircraft having an aircraft body with a powerplant mounted thereon, said powerplant with an aft-directed main propulsion outlet means for providing forward thrust, said aircraft further including duct means located external to said body having an inlet for receiving at least a proportion of the efflux from said main propulsion outlet means, said duct means extending forwardly to an auxiliary outlet disposed adjacent or forwardly of a center of gravity of the aircraft, said auxiliary outlet being arranged to exhaust efflux with at least a vertical component.

2. An aircraft according to claim 1, wherein said auxiliary nozzle is vectorable.

3. An aircraft according to claim 1, wherein said duct means is disposed externally of a main body of the aircraft.

4. An aircraft according to claim 1, wherein at least a part of said duct means is moveable to a stowed, relatively low drag configuration.

5. An aircraft according to claim 1, wherein said aft-directed main propulsion outlet means includes at least two aft-directed propulsion outlets and said inlet including respective inlet aperture regions for association with the propulsion outlets.

6. An aircraft according to claim 1 wherein said auxiliary outlet is disposed forwardly of the centre of gravity, said duct means including a further auxiliary outlet means rearwardly of the centre of gravity of the aircraft.

7. An aircraft according to claim 6, wherein said forward auxiliary propulsion outlet is disposed forwardly beyond the nose of the aircraft.

8. An aircraft according to claim 7, wherein said forward auxiliary propulsion outlet is provided in a telescopically extendable region of said duct means.

9. An aircraft according to claim 1 including a plurality of reaction control nozzles for receiving efflux from said duct and generating control thrusts.

10. Apparatus for fitting to a non vertical/short take off and landing aircraft having a main propulsion outlet for allowing vertical/short take off and landing operation, said apparatus comprising a duct means located external to said aircraft having an inlet adapted to be fitted adjacent a main propulsion outlet of said aircraft and extending forwardly to an auxiliary outlet disposed adjacent or forwardly of a center of gravity of the aircraft said auxiliary outlet being arranged to exhaust efflux with at least a vertical component.

* * * * *

UNITED STATES PATENT AND TRADEMARK OFFICE
CERTIFICATE OF CORRECTION

PATENT NO. : 6,520,450 B1
DATED : February 18, 2003
INVENTOR(S) : Seyfang

It is certified that error appears in the above-identified patent and that said Letters Patent is hereby corrected as shown below:

<u>Title page,</u>
Item [22], "Filed: Mar. 8, 1998" should read -- Filed: Mar. 8, 1999 --.

Signed and Sealed this

Twenty-fourth Day of June, 2003

JAMES E. ROGAN
*Director of the United States Patent and Trademark Office*